United States Patent [19]
Hojo

[11] Patent Number: 5,453,606
[45] Date of Patent: Sep. 26, 1995

[54] APPARATUS FOR ADJUSTING THE OPTICAL AXIS OF AN OPTICAL SYSTEM

[75] Inventor: Masanori Hojo, Osaka, Japan

[73] Assignee: Minolta Co. Ltd., Osaka, Japan

[21] Appl. No.: 208,983

[22] Filed: Mar. 10, 1994

[30] Foreign Application Priority Data

Mar. 11, 1993 [JP] Japan .................................. 5-050702

[51] Int. Cl.[6] ................................................. G01B 11/27
[52] U.S. Cl. ................................... 250/201.1; 250/206.2; 356/153; 356/400
[58] Field of Search .......................... 250/201.1, 206.1, 250/206.2, 208.1, 208.2, 237 R; 356/400, 399, 141.5, 153

[56] References Cited

U.S. PATENT DOCUMENTS

| | | | |
|---|---|---|---|
| 4,772,123 | 9/1988 | Radner | 356/400 |
| 5,103,082 | 4/1992 | Fonneland et al. | 250/201.1 |

FOREIGN PATENT DOCUMENTS

| | | |
|---|---|---|
| 60-150016 | 8/1985 | Japan . |
| 63-103932 | 5/1988 | Japan . |
| 197832 | 4/1989 | Japan . |

*Primary Examiner*—Edward P. Westin
*Assistant Examiner*—John R. Lee
*Attorney, Agent, or Firm*—Price, Gess & Ubell

[57] ABSTRACT

An apparatus for adjusting optical axes of lenses in a lens system detects disagreement of the optical axes, adjusts the position of a subject lens, and fixes the adjusted lens to a lens frame. Parallel light beams constituted by a central and circular peripheral beams are projected to the lens system and form beam spot images on a light receiver. Disagreement of the optical axes is detected as a positional difference between the central beam spot and the centroid of the peripheral beam spots. The subject lens is moved by an adjustment device based on the difference. Adjustment is achieved by repeating the process automatically, and the lens is fixed at the position after the adjustment.

12 Claims, 9 Drawing Sheets

APPARATUS FOR ADJUSTING THE OPTICAL AXIS OF AN OPTICAL SYSTEM

BACKGROUND OF THE INVENTION

1. Field of the Invention

The present invention relates to an apparatus for adjusting the optical axes of lens systems.

2. Description of the Prior Art

The size reduction of optical elements such as lenses for cameras and pick-up lenses for optical disks and the variety of aspherical lenses decrease the decentering amount permissible to one lens, and it is required that the error of the optical axis of an optical system is guaranteed to be within several microns. However, it is impossible to achieve such a guarantee only by improving the processing accuracy of parts (lenses and lens frames). As methods to achieve this guarantee by adjusting the optical axis in the assembly of lens systems, a reflection-type method and a transmission-type (point image analysis-type) method in which the disagreement of the optical axes is detected are known.

FIG. 1 is a side view of a conventional apparatus for adjusting the optical axes of lens systems. When two single lenses LS1 and LS2, for example, are attached to a lens frame 9 as shown in FIG. 1, it is necessary for the optical axes of the lenses LS1 and LS2 to coincide with each other. In assembling a high-precision lens system such as the pick-up lens for optical disks for which it is required that a lens diameter is 7 mm or less, that the total decentering after assembly is 1° to 2°, that the total focal length after assembly is 7 mm or less and that the transmission wave front aberration is $\lambda/5$, it is particularly important that the optical axes of the single lenses coincide with each other.

A pinhole plate 2 having a pinhole with a diameter of approximately 1 mm is arranged to the left of a light source 1, a neutral density (ND) filter 3 is arranged to the left thereof, a collimator lens 4 is arranged to the left thereof, and a mirror 5 is arranged to the left thereof. Of the light emitted from the light source 1, the light having passed through the pinhole plate 2 passes through the ND filter 3 and the collimator lens 4 and becomes collimated light R, which is reflected by the mirror 5 and proceed downward. A pinhole plate 2' having a pinhole with a diameter of 1 mm is arranged below the mirror 5, and below it, a subject lens system T' to be adjusted is placed. The subject lens system T' is now being assembled, and while the lens LS2 has been fixed to a lens frame 9, the lens LS1 has not been fixed yet. A microscopic lens 19 is arranged below the subject lens system T'. A point image formed by the pinhole plate 2' passes through the lenses LS1 and LS2 in the lens frame 9 and is viewed through the microscopic lens 19.

The point image viewed through the microscopic lens 19 appears at the center if the optical axes of the lenses LS1 and LS2 coincide with each other and the point image is shifted from the center if the optical axes disagree. When the point image viewed is shifted from the center, the lens LS1 is slightly moved by means of a thin rod so that the point image is located at the center. After the adjustment has been completed, the lens LS1 is fixed to the lens frame 9 with an adhesive.

This method is not highly reliable; since an operator has to perform the adjustment to remove the shift of the point image from the center while viewing the point image, this adjustment requires skill, lacks mass productivity and the adjustment results differ according to the operator. Therefore, it is impossible to achieve detection precision of submicron order.

To solve this problem, Japanese Unexamined Patent Publication No. S60-150016 has proposed a method in which a photoelectric device divided into four parts which are, for example, fan-shaped with the optical axis as the center is arranged on the focal plane of a compound lens and the shift of the point image from the optical axis is photoelectrically and quantitatively evaluated by comparing the outputs from the parts of the photoelectric device. According to this method, it is possible to center and edge a predetermined lens by moving it so that the center of the point image is located to the center of division of the photoelectric device.

However, in performing the centering and edging by this method, it is necessary for the optical axis of a lens system in the compound lens which serves as a reference to coincide accurately with the center of division of the photoelectric device, and the resolution of the photoelectric device is limited. Therefore, for a lens to be mass-produced such as a photographic lens, it is necessary to adjust the optical axis for every lens, which increases the adjustment work tremendously.

SUMMARY OF THE INVENTION

An object of the present invention is to provide an apparatus for adjusting the optical axes of lenses in an assembling process of a lens system. By this apparatus, disagreement of the optical axes of lenses are detected promptly, adjustment of the lenses are performed accurately and automatically, and the adjusted lens is fixed to the lens frame readily.

To achieve the above-mentioned object, the apparatus according to the present invention is provided with the following devices and features. A lens system is mounted on the apparatus with the optical axis in the vertical direction. The lens system includes a lens already fixed to a lens frame and a subject lens which is to be adjusted. A light projector and a light receiver are provided above and below the lens system, respectively. A data processing device comprising an image processing portion and a calculation processing portion, and an adjustment device as well as an ultraviolet ray irradiation device are provided. The light projector has a pinhole plate in which a plurality of pinholes are formed to project parallel light beams to the lens system. The pinholes are arranged at the center of a circle and on the circumference at regular intervals. The light beams from the light projector pass through the lens system and form spot images on the surface of the light receiver. Disagreement of the optical axes of the lenses is detected as a positional difference between the central beam spot and the centroid of the peripheral beam spots. The positional difference is calculated by the data processing device, and then converted to a correction amount of the subject lens. The adjustment device moves the subject lens in two directions based on the correction amount, and the agreement of the optical axes are improved, and accordingly the beam spot image is changed. By repeating this operation, disagreement of the optical axes converges within a permissive value. After the adjustment of the optical axes the subject lens is fixed to the lens frame at the position with an ultraviolet setting adhesive.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
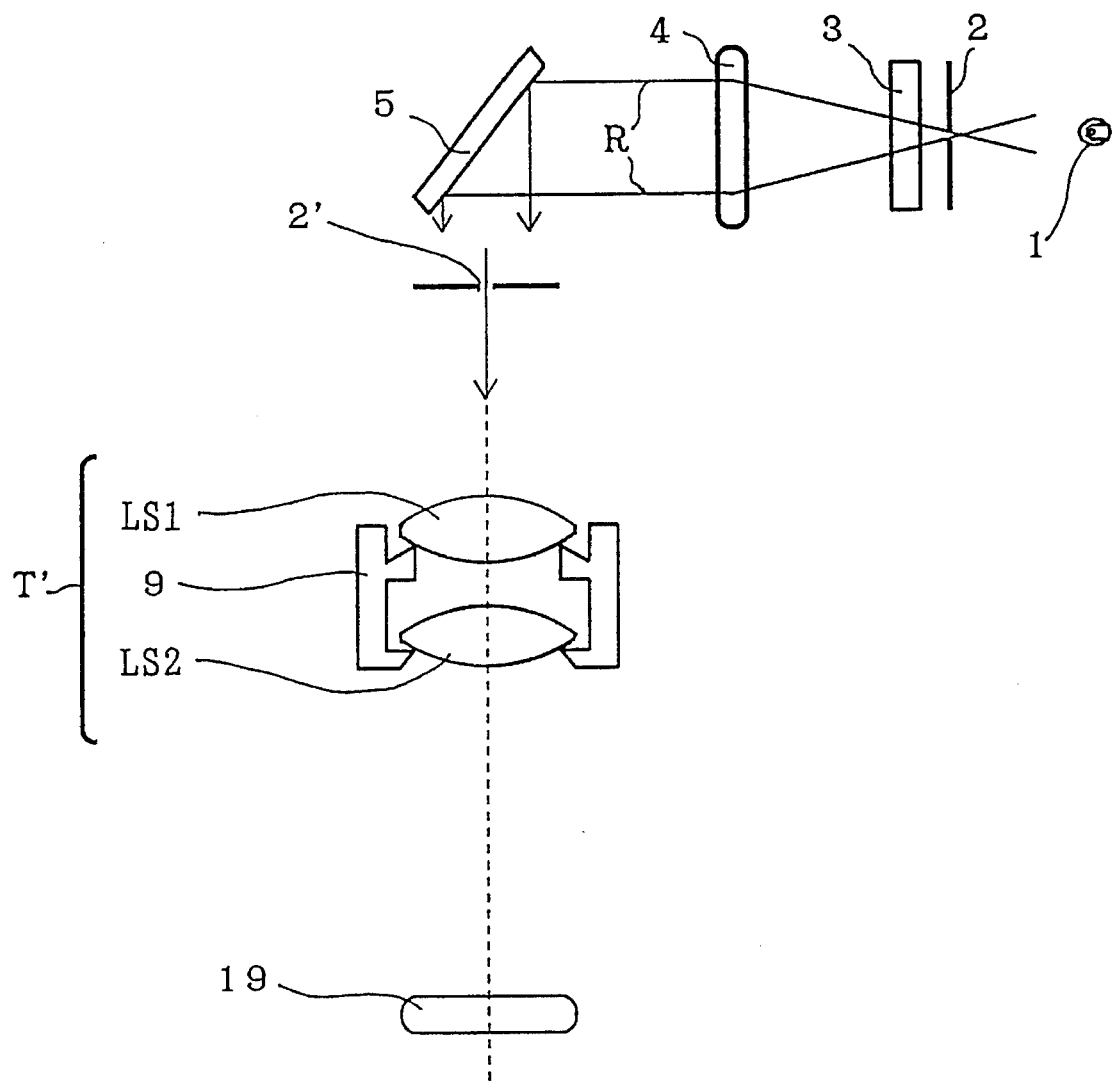
FIG. 1 is a side view of a conventional optical axis adjustment assembling apparatus.

An apparatus for adjusting the optical axes of lens systems embodying the present invention will be described with reference to the schematic view of FIG. 2, wherein a pinhole plate 2 having a pinhole with a diameter of approximately 0.6 mm is arranged to the left of a light source 1, an ND filter 3 is arranged to the left thereof, a collimator lens 4 is arranged to the left thereof, and a mirror 5 is arranged to the left thereof. Of the light emitted from the light source 1, the light having passed through the pinhole plate 2 passes through the ND filter 3 and the collimator lens 4 and becomes collimated light R, which is reflected by the mirror 5 and becomes collimated light R' proceeding downward.

Below the mirror 5, a plate-form opaque chart 17 is arranged so that its surface is vertical to the optical axis, and below it, a subject lens system T is arranged. At the central point of the chart 17 and at eight points with equal spaces therebetween along a circular zone with the central point as the center, pinholes with a diameter of approximately 0.8 mm to 1.0 mm are formed. The subject lens system T includes, as shown in FIG. 2, a lens frame 9, a lens system 10 fixed to the lens frame 9, a lens system 8 to be adjusted placed at an upper portion of the lens frame 9 and an adjusting member 7 which comes into contact with the lens system 8. The lens frame 9 is inserted into an attachment portion 11 provided to the body. The lens systems 8 and 10 include one or a plurality of lens elements. The collimated light R' is intercepted by the chart 17, and only nine light beams having passed through the central point of the chart 17 and the eight points with equal spaces therebetween along a circular zone with the central point as the center pass through the subject lens system T to form an image on an image plane 18 at an arbitrary position.

Further below, a microscopic lens 12 is arranged on the same optical axis, and below it, a CCD camera 13 is arranged so that its image receiving plane is vertical to the optical axis. The microscopic lens 12, the CCD camera 13 and a focusing device 23 are provided on an X-Y table moved by an X-Y rough adjustment member 22, and operate in synchronism therewith. By moving the X-Y rough adjustment member 22, an image is captured within the image receiving plane of the CCD camera 13.

The CCD camera 13 converts the image captured within its image receiving plane into a video signal S1 and provides it to an image processing portion 14. Based on the video signal S1, the image processing portion 14 converts the illuminance at each pixel into binary data by providing "1" to pixels, such as pixels located at a point of irradiation, having an illuminance higher than a predetermined threshold value and providing "0" to other pixels having a lower illuminance, thereby producing a signal S2 containing illuminance information. The signal S2 is provided to a calculation processing portion 15.

The calculation processing portion 15, which is constituted by a microcomputer, has software for producing signals S4, S5 and S6 to proceed the adjustment and for driving an X-Y fine adjustment member 21, the X-Y rough adjustment member 22 and the focusing device 23. A display portion 16 provides display based on a signal S7 supplied from the calculation processing portion 15.

The X-Y fine adjustment member 21, the X-Y rough adjustment member 22 and the focusing device 23 are driven by a servo-motor (not shown) or a pulse motor (not shown). The X-Y fine adjustment member 21 is moved in bi-axial directions, that is, back and forth and right and left based on the signal S4 supplied from the calculation processing portion 15 to thereby slightly move the lens system 8 through the adjusting member 7 (with which the lens system 8 is in contact). The adjusted position of the lens system 8 is maintained thereafter. The X-Y rough adjustment member 22 moves the microscopic lens 12, the CCD camera 13 and the focusing device 23 in bi-axial directions, that is, back and forth and right and left based on the signal S5 supplied from the calculation processing portion 15. The movement is stopped when the image is captured within the image receiving plane of the CCD camera 13, and the positions of the microscopic lens 12, the CCD camera 13 and the focusing device 23 at that time are maintained. The focusing device 23 moves the CCD camera 13 in a uniaxial direction, that is, up and down based on the signal S6 supplied from the calculation processing portion 15, thereby varying the size of the image captured within the image receiving plane of the CCD camera 13. When an image of a desired size is obtained, the movement of the CCD camera 13 is stopped and the position of the CCD camera 13 at that time is maintained.

Results of the adjustment by the driving of the X-Y fine adjustment member 21, the X-Y rough adjustment member 22 and the focusing device 23 are thus always provided to the calculation processing portion 15 through the CCD camera 13 and the image processing portion 14. Based on them, the calculation processing portion 15 applies feedback to the X-Y fine adjustment member 21, the X-Y rough adjustment member 22 and the focusing device 23 to repeat the optical axis adjustment.

During the above adjustment, an ultraviolet irradiating unit 6 arranged above the subject lens system T is shunted. When the adjustment is completed, it moves to a position just above the subject lens system T in response to a signal S8 supplied from the calculation processing portion 15 to irradiate ultraviolet rays to an ultraviolet setting adhesive applied to the lens system 8.

Figure 2:
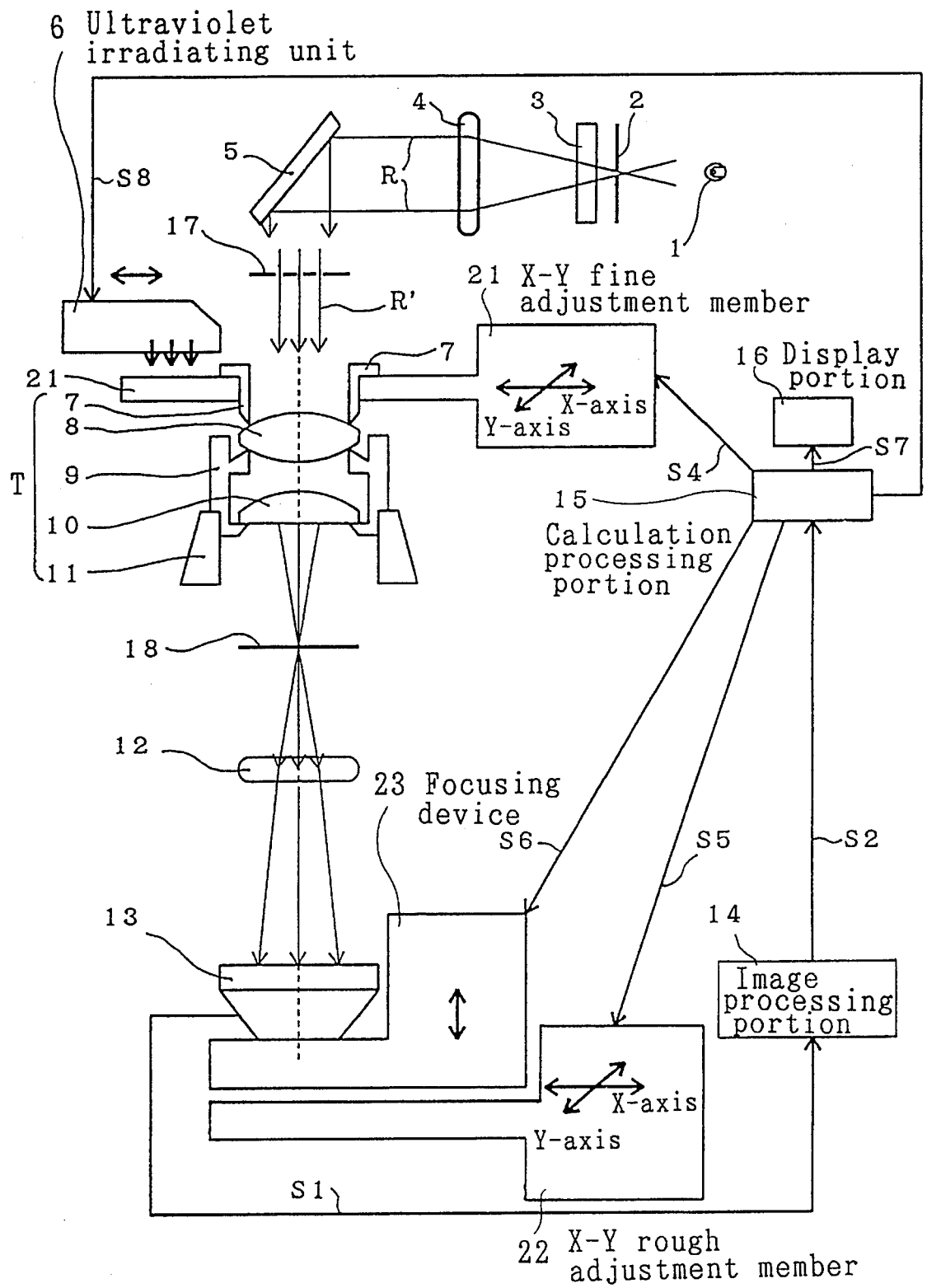
FIG. 2 is a schematic view showing an arrangement of an apparatus for adjusting the optical axes of lens systems embodying the present invention.
Figure 3:
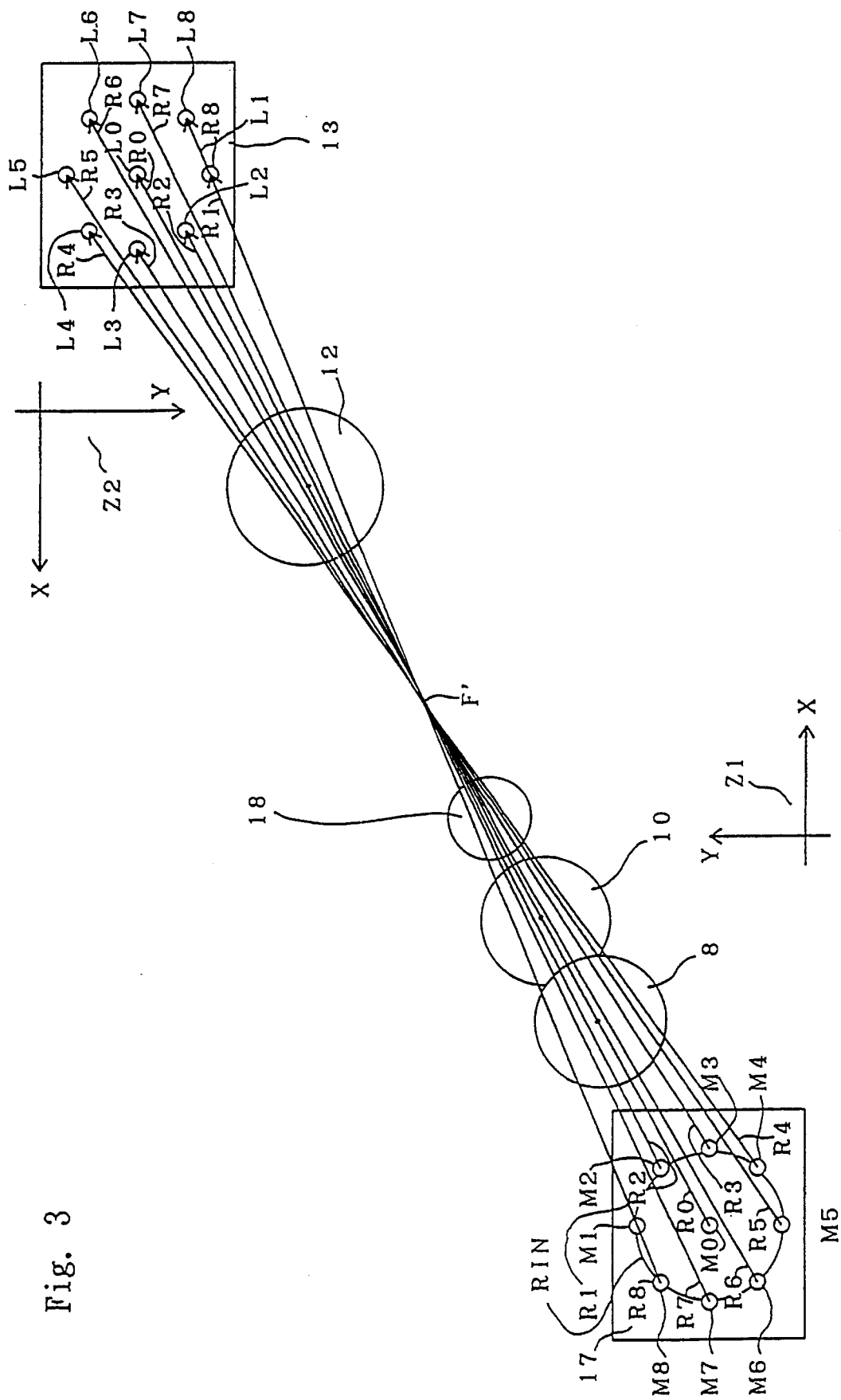
FIG. 3 shows a condition of image formation of the optical axis adjusting apparatus embodying the present invention.

FIG. 3 is a view with respect to image formation of the optical axis adjusting apparatus of FIG. 2. The chart 17 has a pinhole M0 at the central point at which it (the chart 17) and the optical axis intersect, and has pinholes M1, M2, M3, M4, M5, M6, M7 and M8 at the eight points with equal spaces therebetween along a circular zone RIN with the central point as the center. The diameter of the circular zone RIN is 0.7 to 0.9 times the maximum diameter of luminous flux of the subject lens system T since the larger the diameter of the circular zone RIN is, the higher the sensitivity of axial coma detection is. The chart 17 may be arranged anywhere as far as it is above the image plane 18 but below the mirror 5. However, it is preferable not to arrange the chart 17 in the vicinity of the image plane 18, since the diameter of the circular zone should be considerably small in the vicinity of the image plane 18 and this deteriorates the measurement precision.

The collimated light R' is mostly intercepted by the chart 17, and only light beams R0, R1, R2, R3, R4, R5, R6, R7 and R8 passing through the nine pinholes M0, M1, M2, M3, M4, M5, M6, M7 and M8 are allowed to proceed. The light beams R0 to R8 converge on a composite focal point F' of the lens systems 8 and 10. The numeral 18 represents one of the image planes formed at an arbitrary position at this time.

The microscopic lens 12 enlarges the image plane 18 and forms an image on the image receiving plane of the CCD camera 13. Irradiation points L0, L1, L2, L3, L4, L5, L6, L7 and L8 are groups of pixels to which the light beams R0, R1, R2, R3, R4, R5, R6, R7 and R8 are irradiated, respectively. An adjustment by slightly moving the lens systems 8 and 10 is performed in the directions of X and Y axes of a coordinate system Z1. A coordinate system Z2 is used to indicate a position on the image receiving plane of the CCD camera 13.

When the optical axis of the lens system 8 ideally coincides with the optical axes of the lens system 10 and all other optical systems, the position of centroid of the irradiation points L1 to L8 along the circular zone obtained through the light beams R1 to R8 having passed through the lens systems 8 and 10 coincides with the position of center of the central irradiation point L0 obtained through the light beam R0 having passed through the lens systems 8 and 10. However, if the optical axis of the lens system 8 disagrees with the optical axes of the lens system 10 and other optical systems, the position of centroid of the irradiation points L1 to L8 along the circular zone disagrees with the position of center of the central irradiation point L0.

Figure 4:
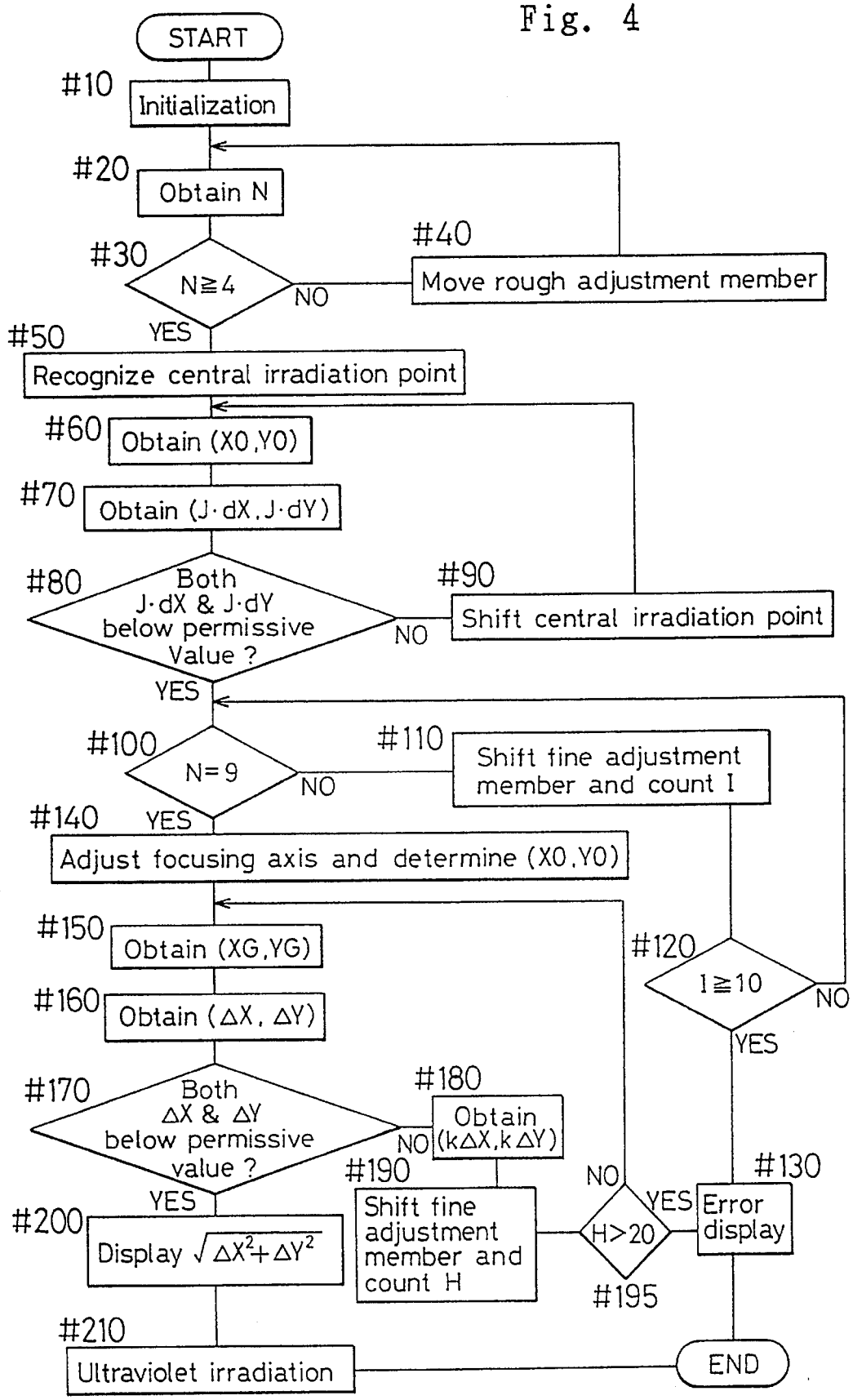
FIG. 4 is a flowchart of an operation of software provided to a calculation processing portion of the optical axis adjusting apparatus embodying the present invention.
Figure 5A:
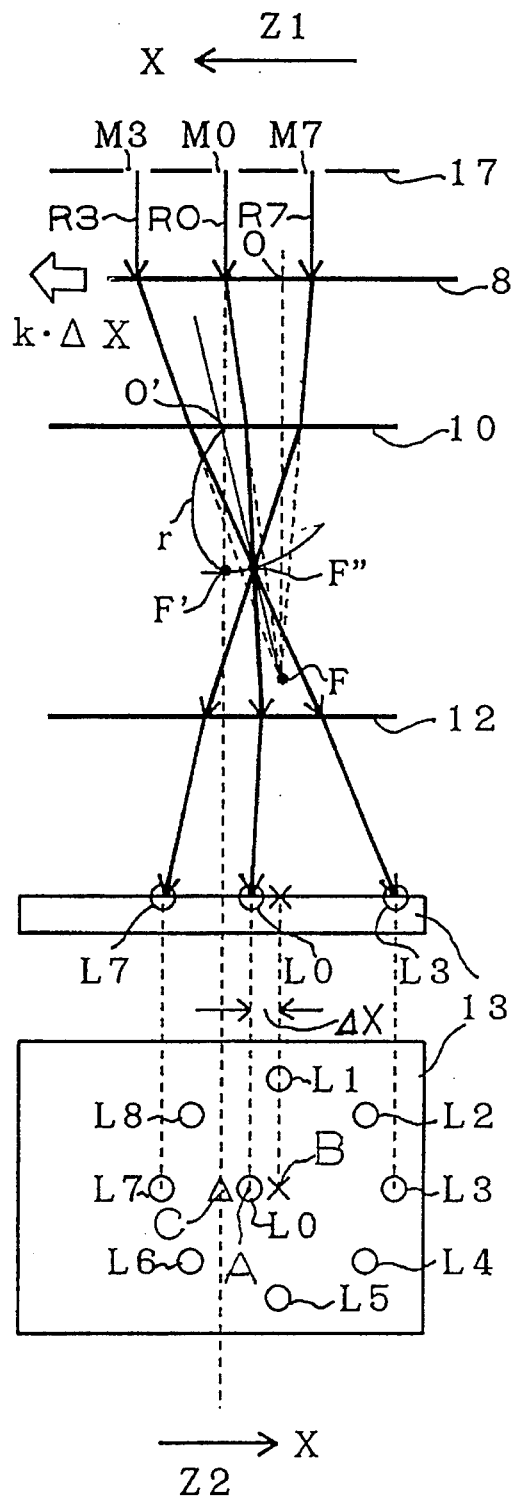
FIGS. 5A and 5B show conditions of image formation by a fine adjustment performed by the optical axis adjusting apparatus embodying the present invention.
Figure 5B:
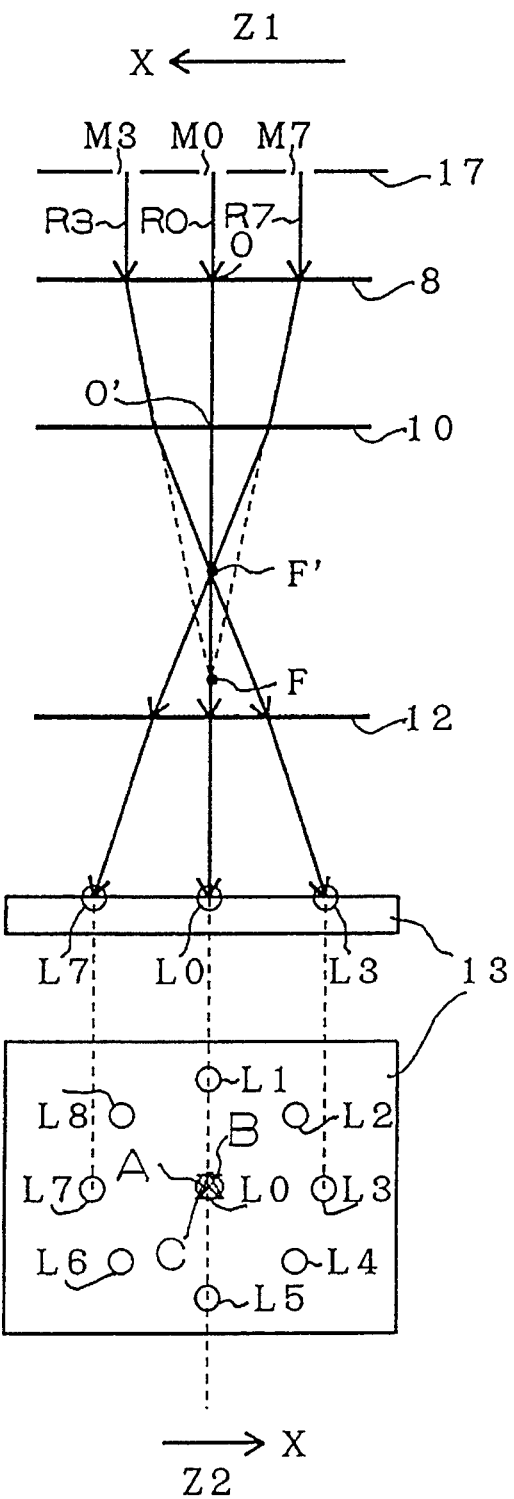

FIG. 4 shows a flowchart of the software provided to the calculation processing portion 15, and the operation will be explained with reference to the flowchart. FIGS. 5A and 5B are views with respect to image formation by fine adjustment. FIGS. 6A to 6E show examples of images formed on the image receiving plane of the CCD camera 13. In FIGS. 5A and 5B and 6A to 6E, the same portion as those of FIGS. 2 and 3 are denoted by the same reference designations and description thereof will not be given. In FIGS. 6A to 6E, the reference character A represents the coordinates of the center of the central irradiation point, the reference character B represents the coordinates of the centroid of the irradiation points along the circular zone, and the reference character C represents reference coordinates at the center of the image receiving plane. The coordinate system Z2 whose X-axis is lateral and Y-axis is longitudinal is set on the image receiving plane, and the coordinates are provided to the pixels on the image receiving plane based on the coordinate system Z2.

Referring to FIG. 4, at step #10, all the variable parameters used for calculation are set to "0" and the apparatus is set to an initial state. At step #20, the signal S2 is received to obtain the binary illuminance data of each pixel: Adjoining pixels with an illuminance of 1 are judged to belong to an irradiation point on the image receiving plane and the number N of the irradiation points is obtained.

At step #30, when the number N of irradiation points on the image receiving plane is 1 to 3 (the number of irradiation points along the circular zone RIN is 0 to 2), since it is impossible to obtain the centroid of the circular zone RIN, the process proceeds to step #40, where the signal S5 is produced and provided to the X-Y rough adjustment member 22 to move the X-Y rough adjustment member 22 and the subject lens system T attached thereto. Then, the process returns to step #20. When the number of irradiation points on the image receiving plane is four or more (the number of irradiation points along the circular zone RIN is three or more), the process proceeds to step #50.

Figure 6A:
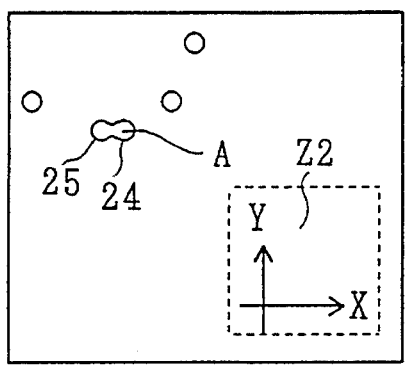
FIGS. 6A to 6E show images formed on an image receiving surface of a charge coupled device (CCD) camera of the optical axis adjusting apparatus embodying the present invention.
Figure 6B:
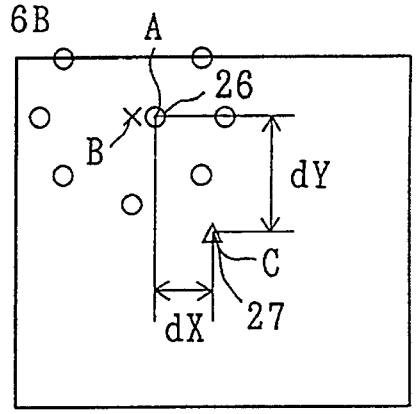

At step #50, the signal S4 to slightly move the X-Y fine adjustment member 21 at random is produced and provided to the X-Y fine adjustment member 21. Even if the central irradiation point 24 and an irradiation point 25 on the circular zone RIN overlap each other as shown in FIG. 6A, they will no longer overlap as shown in FIG. 6B after the position of the lens system 8 is shifted. In this case, although the number N of recognized irradiation points increases, no problem is caused and the subsequent operation accelerates. Of the irradiation points separated from one another as shown in FIG. 6B, one irradiation point 26 located at a point surrounded by others (a point inside the irradiation points L1 to L8 along the circular zone) is recognized as the central irradiation point.

At step #60, the averages of X-coordinates $X0_1$ to $X0_n$ and coordinates $Y0_1$ to $Y0_n$ of all the pixels provided with "1" during the conversion to binary data are calculated as a central coordinate A(X0, Y0). That is, when SUM represents a function to obtain the sum total, the central coordinate is obtained by $$X0 = \frac{SUM(X0_1 \text{ to } X0_n)}{n}, Y0 = \frac{SUM(Y0_1 \text{ to } Y0_n)}{n}$$

At step #70, the deviation (dX, dY)=(X0−XC, Y0−YC) between the central coordinate A(X0, Y0) of the central irradiation point 26 and the reference coordinate C (XC, YC) on the image receiving plane center 27 is multiplied by J (J is a constant) to obtain a rough adjustment correction amount (J·dX, J·dY).

At step #80, when both of J·dX and J·dY of the rough adjustment correction amount are below a permissive value, since the central irradiation point is located substantially at the center of the image receiving plane, the rough adjustment is completed and the process proceeds to step #100. When at least either of J·dX and J·dY is equal to or above the permissive value, the process proceeds to step #90 to repeat the rough adjustment.

Figure 6C:
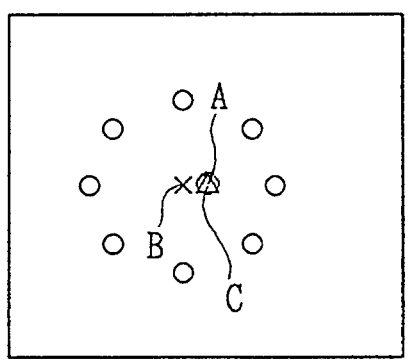
Figure 6D:
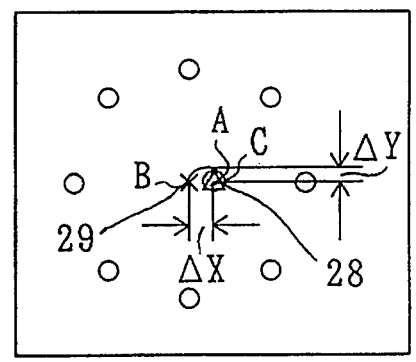

At step #90, the signal S5 containing the rough adjustment correction amount (J·dX, J·dY) is provided to the X-Y rough adjustment member 22. The X-Y rough adjustment member 22 moves the subject lens system T by J (J is a constant) times dX along the axis in the X direction and by J times dY along the axis in the Y direction to shift the central irradiation point to the vicinity of the reference coordinate C as shown in FIG. 6C. Then, the process returns to step #60.

At step #100, when, as shown in FIG. 6C, the number N of irradiation points on the image receiving plane is 9 which is the normal number, the process proceeds to step #140. When the number N of irradiation points on the image receiving plane is less than 9, since there are irradiation points overlapping each other, the process proceeds to step #110, where the lens system 8 is slightly moved.

At step #110, to separate the overlapping irradiation points, the signal S4 is provided to the X-Y fine adjustment member 21 to slightly move it at random, and the adjusting member 7 fixed thereto slightly shifts the lens system 8. Further, how many times this step was executed (the number of times I) is counted.

At step #120, when the counted number of times I is below 10, the process returns to step #100, and when the counted number of times I reaches 10, the process proceeds to step #130, where the fine adjustment is canceled and the signal S7 is provided to the display portion 16 to show an error message. Then, the adjustment operation ends.

At step #140, the signal S6 is provided to the focusing device 23 to move it upward or downward to a position at which an image as large as possible is obtained on the image receiving plane of the CCD camera 13 under a condition where the nine irradiation points are located within the image. Further, the averages of the X-coordinates $X0_1$ to $X0_n$ and Y-coordinates $Y0_1$ to $Y0_n$ of all the pixels belonging to the central irradiation point 28 at this time are again calculated as the central coordinate A(X0, Y0).

At step #150, the averages of X-coordinates $XR_1$ to $XR_m$ and Y-coordinates $YR_1$ to $YR_m$ of all the pixels belonging to eight irradiation points along the circular zone RIN except the central irradiation point 28 are calculated to obtain a centroid coordinate B(XG, YG) at the centroid 29 of the circular zone RIN. That is, the centroid coordinate (XG, YG) is obtained by $$XG = \frac{SUM(XR_1 \text{ to } XR_m)}{m}, \quad YG = \frac{SUM(YR_1 \text{ to } YR_m)}{m}$$

At step #160, the deviation (XG–X0, YG–Y0) between the central coordinate A(X0, Y0) and the centroid coordinate B(XG, YG) is calculated as an axial coma amount ($\Delta X$, $\Delta Y$).

At step #170, when at least either of $\Delta X$ and $\Delta Y$ of the axial coma amount is equal to or above a permissive value, the process proceeds to step #180 to repeat the adjustment. When both of $\Delta X$ and $\Delta Y$ are below the permissive value, completing the adjustment, the process proceeds to step #200. This is a simplified method of judging the adjustment of the optical axes. It is preferable and strict to obtain $\sqrt{\Delta X^2 + \Delta Y^2}$ and compare the value with the permissive value instead of comparing each $\Delta X$ and $\Delta Y$ with the permissive value, since disagreement of the optical axes may take place obliquely to X and Y directions as well as along one of them and it depends on the orientation of the lens system T at the time the lens frame 9 was mounted on the attachment portion 11.

At step #180, a fine adjustment correction amount (k$\Delta X$, k$\Delta Y$) is calculated in order to move the lens system 8 by k (k is a constant) times $\Delta X$ along the axis in the X direction of the X-Y fine adjustment member 21 and by k times the $\Delta Y$ along the axis in the Y direction of the member 21.

The value of k, which is proper to each apparatus, is measured in advance in the following manner. In FIGS. 5A and 5B, for simplicity, it is assumed that only the adjustment in the X-axis direction of the lens system 8 is necessary. The reference character F represents a focal point of only the lens system 8. The reference character F' represents a composite focal point of the lens systems 8 and 10 when their optical axes coincide. The reference character F" represents a composite focal point of the lens systems 8 and 10 when their optical axes do not coincide as shown in FIG. 5A. The composite focal point F" is obtained at a point of intersection of a focal plane (spherical surface with a radius r) including the composite focal point F' and a line connecting the lens system 10 and the focal point F. The reference character O represents the point of center of the lens system 8. The reference character O' represent the point of center of the lens system 10. FIG. 5B shows an image formation condition after the completion of the adjustment of the optical axis.

The light beams R0, R3 and R7, and R1, R2, R4, R5, R6 and R8 (FIG. 3), which are parallel beams, advance straight toward the focal point F of the lens system 8 after passing therethrough. After passing through the lens system 10, they advance straight toward the composite focal point F", and through the microscopic lens 12, they are formed into an image on the image receiving plane of the CCD camera 13 to irradiate the pixels at the irradiation points L1 to L8. At this time, as shown in the figure, the deviation (axial coma amount) $\Delta X$ between the position of the centroid B of the irradiation points L1 to L8 along the circular zone and the position of the center A of the central irradiation point L0 is measured according to the coordinate system Z2. Thereafter, the distance k$\Delta X$ by which the lens system 8 is actually moved until the adjustment is completed as shown in FIG. 5B is measured according to the coordinate system Z1, and the obtained value of k$\Delta X$ is divided by the obtained value of $\Delta X$ to obtain the value of k.

Figure 6E:
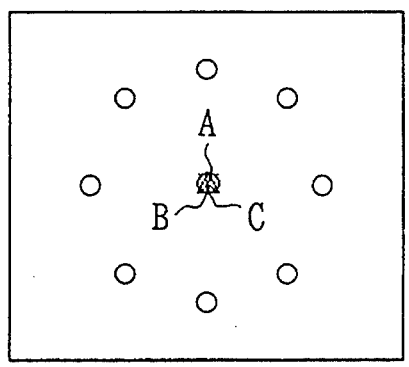

At step #190, the signal S4 containing information on the fine adjustment correction amount (k$\Delta X$, k$\Delta Y$) is produced and supplied to the X-Y fine adjustment member 21 to slightly move it so that the lens system 8 is slightly moved by means of the adjusting member 7 attached to the member 21. At this time, in the image on the image receiving plane of the CCD camera 13, the centroid coordinate B approaches the central coordinate A from the condition shown in FIG. 6D, and as the step #190 is repeated, the centroid coordinate B and the central coordinate A substantially coincide with each other in the vicinity of the reference coordinate C as shown in FIG. 6E. Further, after counting how many times this step was executed (the number of times H), the process proceeds to step #195. At step #195, when the number of times H is equal to 20 or less, the process returns to step #150. When the number of times H exceeds 20, it is assumed that the values of $\Delta X$ and $\Delta Y$ will not converge within the permissive value by fine adjustment, and the process proceeds to step #130, where an error message is displayed and the adjustment operation ends.

At step #200, an axial coma amount $\sqrt{\Delta X^2 + \Delta Y^2}$ is calculated, and the signal S7 containing it is supplied to the display portion 16 to display the amount of axial coma.

At step #210, adjustment of the optical axis having been completed, the ultraviolet irradiating unit 6 arranged above the subject lens system T and shunted is moved to a position directly above the subject lens system T to irradiate ultraviolet rays to the lens system 8. To the position at which the lens system 8 and the lens frame 9 are in contact, the ultraviolet setting adhesive is applied in advance, and the adhesive sets immediately by the ultraviolet rays from the irradiating unit 6. Therefore, it is possible to fix the lens system 8 in a condition where the adjustment of its optical axis has been completed. After a predetermined period of time has passed, the ultraviolet irradiating unit 6 stops ultraviolet irradiation and is shunted to a position at which it does not intercept the optical system, and the adjustment and the fixing of the lens system 8 are completed.

Figure 7A:
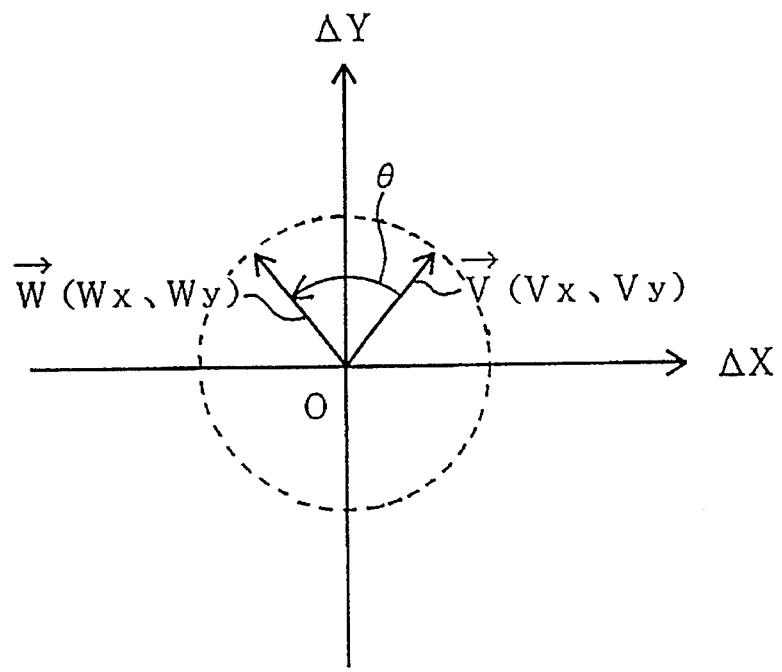
FIGS. 7A and 7B graphically show the amount of axial coma.

Subsequently, the amount of axial coma will be described with reference to the graphs of FIGS. 7A and 7B. If the measuring system of FIG. 2 is completely aligned, when the subject lens system T is rotated at an angle θ, since a vector obtained by rotating V(Vx, Vy) at an angle θ, the vector V(Vx, Vy) being the axial coma amount before the rotation of the lens system T, coincides with a vector W(Wx, Wy) of axial coma amount after the rotation of the lens system T, the magnitudes of the vectors V and W, $\sqrt{Vx^2+Vy^2}$, $\sqrt{Wx^2+Wy^2}$ are equal to each other as shown in FIG. 7A.

Figure 7B:
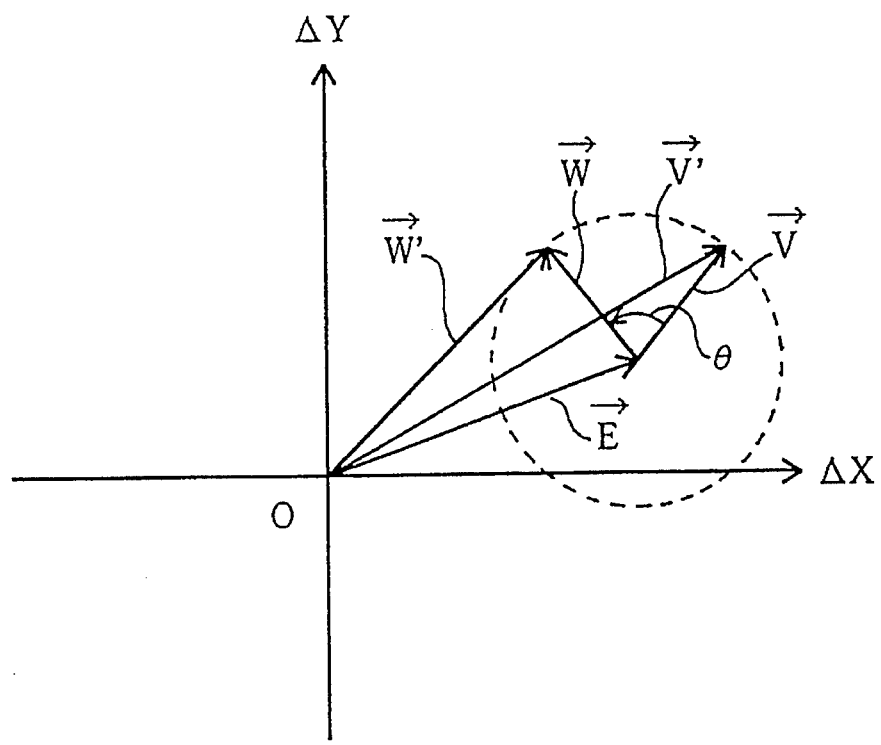

However, since there are errors in the actual alignment of the measuring system, the magnitudes of vectors V' and W' are not equal to each other as shown in FIG. 7B. This is because a vector E exists which is proper to the alignment of the measuring system. That is, the measured vector V' is equal to the sum of the vector E and the vector V before the rotation proper to the subject lens system T. The vector W' measured in a similar manner is equal to the sum of the vector E and the vector W after the rotation proper to the subject lens system T.

Therefore, it is preferable to obtain the vector E proper to the alignment of the measuring system in advance and correct the axial coma amount by use of the obtained vector E. The following is a simple way to obtain the vector E: the subject lens system T is rotated at a rotation angle of π radian to obtain the axial coma amounts (Vx, Vy), (Wx, Wy) of the vectors V' and W', and the sum of them (Vx+Wx, Vy+Wy) is divided by 2 to obtain the vector E ((Vx+Wx)/2, (Vy+Wy)/2). The verification of this manner will not be given since it is easy.

Figure 8A:
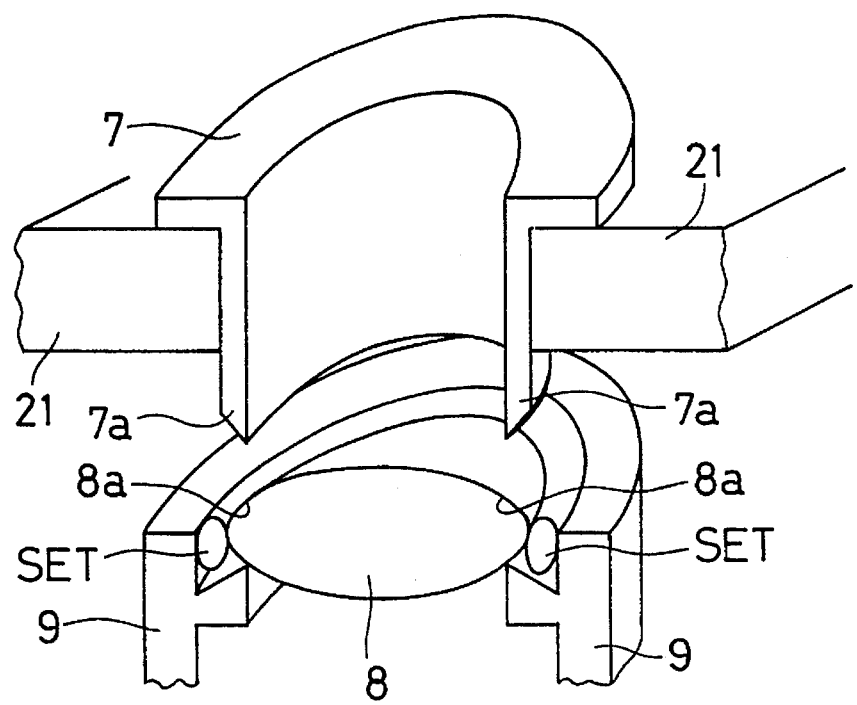
FIGS. 8A and 8B are cross-sectional views of an adjusting member of the optical axis adjusting apparatus embodying the present invention.
Figure 8B:
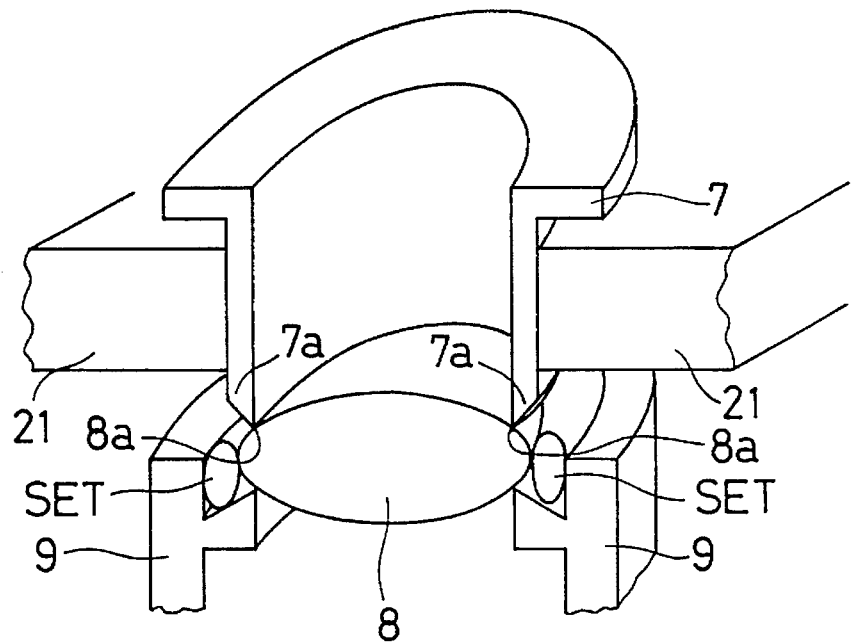

FIGS. 8A and 8B are cross-sectional views of the lens system 8 and the adjusting member 7 where the surface of the lens system 8 which is in contact with the lens frame 9 is a spherical surface or a plane surface. As shown in FIG. 8A, the X-Y fine adjustment member 21 has above the lens system 8 a hole with a diameter substantially equal to that of the lens system 8. A cylindrical adjusting member 7 having an outside diameter substantially equal to the diameter of the hole of the member 21 is inserted down into the hole of the member 21 from the upside. The cross section of the adjusting member 7 is formed to be L-shaped so that the adjusting member 7 does not fall through the hole of the member 21. The lens system 8 is attached to the lens frame 9, and the ultraviolet setting adhesive SET is filled into the gap between the periphery of the lens system 8 and the lens frame 9. Since the ultraviolet setting adhesive SET is liquid and does not set until ultraviolet rays are irradiated thereto, the fine adjustment of the lens system 8 by slightly moving it is not hindered.

When the X-Y fine adjustment member 21 is slowly lowered from the condition shown in FIG. 8A, an end 7a of the adjusting member 7 comes into contact with an edge 8a of the lens system 8 in a circular form. When the X-Y fine adjustment member 21 is further lowered slowly, the dead load of the adjusting member 7 is applied to the edge 8a of the lens system 8 as shown in FIG. 8B. When the X-Y fine adjustment member 21 is moved in the X or Y direction under this condition, the lens system 8 is slightly shifted relative to the lens frame 9 without being damaged by an excessive load or being loose so that the adjustment is not properly made.

Figure 9A:
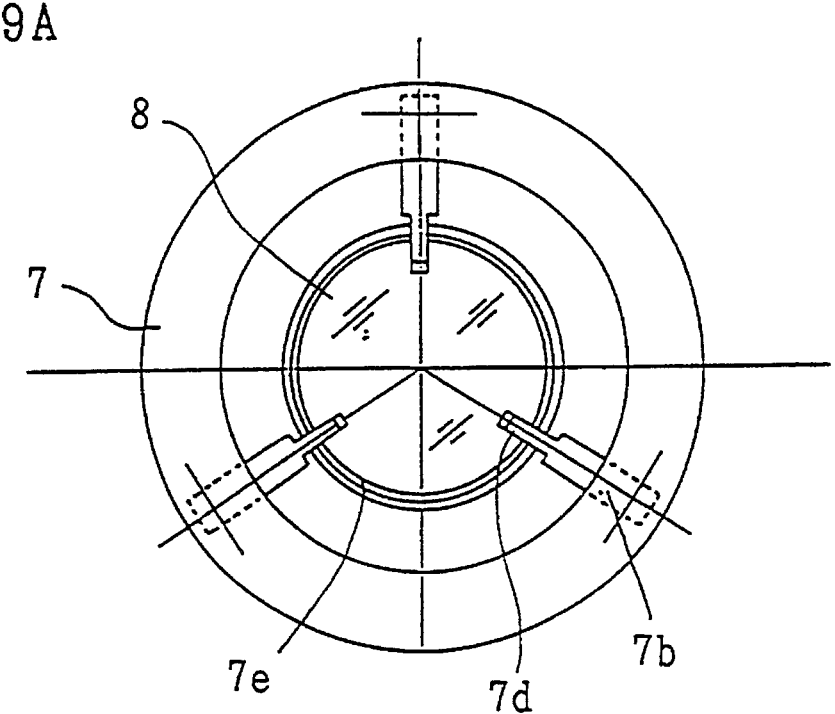
FIGS. 9A and 9B are cross-sectional views of an adjusting member of the optical axis adjusting apparatus embodying the present invention.
Figure 9B:
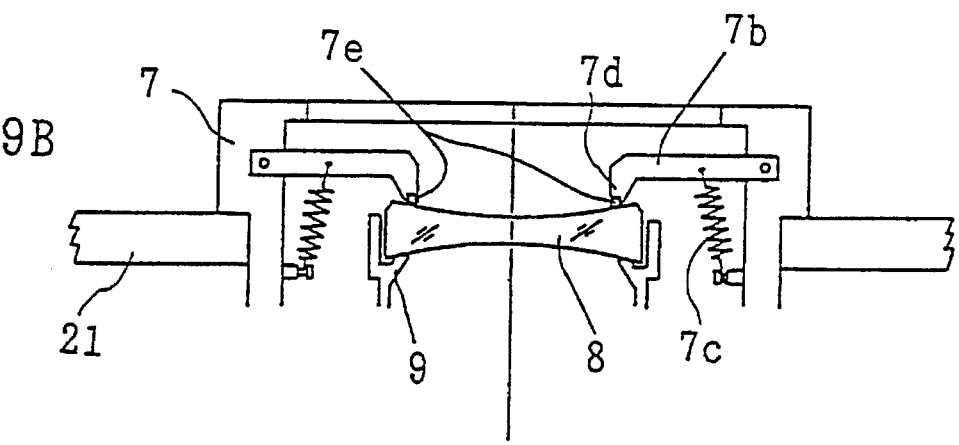

FIGS. 9A and 9B are views of the lens system 8 and the adjusting member 7 where the surface of the lens system 8 which is in contact with the lens frame 9 is aspherical. FIG. 9A is an upper view. FIG. 9B is a lateral sectional view. As shown in FIG. 9B, the X-Y fine adjustment member 21 has a hole with a diameter larger than the diameter of the lens system 8. A cylindrical adjusting member 7 with an outside diameter substantially equal to the diameter of the hole of the member 21 is inserted down into the hole of the member 21 from the upside. The cross section of the adjusting member 7 is formed to be L-shaped so that the adjusting member 7 does not fall through the hole of the X-Y fine adjustment member 21.

As shown in FIG. 9A, inside the adjusting member 7, three spring knobs 7b are arranged at equal spaces. The joints of the spring knobs 7B rotatively move upward and downward, and a spring 7c is attached to the center of each of the knobs 7B. FIG. 9B shows a condition where the spring 7c is stretched; the spring knobs 7b are pulled downward at an appropriate force, and tips 7d of the knobs 7b push the lens system 8 through O-rings 7e placed on the upper surface of the lens system 8. When the X-Y fine adjustment member 21 is moved in the X or Y direction under this condition, the lens system 8 is slightly shifted relative to the lens frame 9 without being damaged by an excessive load or being so loose that the adjustment is not properly made.

A manual operation is possible in which the user directly drives the X-Y fine adjustment member 21, the X-Y rough adjustment member 22, the focusing device 23 and the ultraviolet irradiating unit 6 while confirming image data (illumination of each pixel converted into binary data) from the image processing portion 14 provided, for example, on a display screen.

While eight pinholes are provided in the circular zone RIN in the above description, any number of pinholes may be provided as far as three or more pinholes are provided; the more pinholes are provided, the more the precision improves. Moreover, instead of the arrangement as shown in FIG. 2 where light is irradiated downward, the detecting portion may be provided at an upside so that light may be irradiated from the downside. While the subject lens system T of FIG. 2 has a positive power, a negative subject lens system may also be adjusted by employing a co-axial auxiliary optical system to make the total system positive.

As described above, according to the present invention, the amount of axial coma of a lens system is detected highly accurately in a short period of time, the optical axis is automatically adjusted irrespective of the processing accuracy of parts such as the lens frame and the single lens constituting the lens system, and the lens system is fixed at the adjusted position.

Moreover, by combining the adjusting member and the X-Y table to slightly shift the lens system, the lens system is displaced by the submicron without being damaged or becoming loose so that the adjustment is hindered. Lens systems each constituted by a plurality of lens elements can be adjusted as well as a pair of single lenses.

Particularly, when the bi-aspherical lens in which the error of axial coma per lens is large is used in a great number, since the optical axis is adjusted at the time of assembly, the entire optical system is made compact with no need to improve the processing accuracy of the bi-aspherical lenses.

It is also possible to adjust the axes of more than two groups of lens systems by applying the process according to the present invention sequentially to a subject lens system with reference to the lens systems which have already been adjusted.

Obviously, many modifications and variations of the present invention are possible in light of the above teachings. It is therefore to be understood that within the scope of the appended claims, the invention may be practiced other than as specifically described.

What is claimed is:

1. An apparatus for determining a position of a lens element of an optical system including a plurality of lens elements, comprising:

a light projector which provides a central light beam and peripheral light beams to the optical system;

a light receiver which receives the central light beam and the peripheral light beams which have been passed through the optical system; and a discriminator which discriminates a position shift of the lens element based on a positional difference between a received central light beam and a centroid of received peripheral light beams.

2. A lens position determining apparatus as claimed in claim 1, further comprising an adjustment device which adjusts a position of the lens element based on a result of the discrimination by the discriminator.

3. A lens position determining apparatus as claimed in claim 2, further comprising a fixing device for fixing the position of the lens element after the position has been adjusted.

4. A lens position determining apparatus as claimed in claim 1, wherein the light projector has a pinhole plate and wherein the central light beam and the peripheral light beams are constituted by light having passed through the pinholes.

5. A lens position determining apparatus as claimed in claim 1, wherein the peripheral light beams are projected in a form of a circular zone with the central light beam as its center.

6. A lens position determining apparatus for detecting a position shift between a first lens and a second lens under a condition where the first lens is fixed and the second lens is not fixed, said lens position determining apparatus comprising:

a light projector which provides a central light beam and at least three peripheral light beams to the first and second lenses;

a light receiver which receives the central light beam and the peripheral light beams which have been passed through the first and second lenses;

an illuminance detector for obtaining an illuminance distribution of images formed by the light beams based on a result of a light reception; and a calculation device which calculates a position shift of the second lens from the first lens based on a difference in positions of the central light beam and a centroid of the peripheral light beams, said positions being calculated from the illuminance distribution.

7. A lens position determining apparatus as claimed in claim 6, further comprising an adjustment device which adjusts a position of the second lens based on a result of the calculation by the calculation device.

8. A lens position determining apparatus as claimed in claim 7, further comprising a fixing device for fixing the position of the second lens after the position has been adjusted.

9. A lens position determining apparatus as claimed in claim 6, wherein the light projector has a pinhole plate and wherein the central light beam and the peripheral light beams are constituted by light having passed through the pinholes.

10. A lens position determining apparatus as claimed in claim 6, wherein the peripheral light beams are projected in a form of a circular zone with the central light beam as its center.

11. An apparatus for determining a position of a lens element of an optical system including a plurality of lens elements, comprising:

a light projector which provides a plurality of light beams to the optical system; and a determination device which determines a position shift of the lens element based on relative positions of the light beams having passed through the optical system.

12. A lens position determining apparatus as claimed in claim 11, wherein the determination device makes the determination based on a position of a centroid of the plurality of light beams.

* * * * *